United States Patent
Tehlar et al.

(10) Patent No.: US 10,522,981 B2
(45) Date of Patent: Dec. 31, 2019

(54) WATER AND CONTAMINATION ABSORBER FOR C02 INSULATED ELECTRICAL APPARATUS FOR THE GENERATION, TRANSMISSION, DISTRIBUTION AND/OR USAGE OF ELECTRICAL ENERGY

(71) Applicant: ABB Schweiz AG, Baden (CH)

(72) Inventors: Denis Tehlar, Zürich (CH); Navid Mahdizadeh, Baden (CH); Thomas Alfred Paul, Wädenswil (CH)

(73) Assignee: ABB Schweiz AG, Baden (CH)

( * ) Notice: Subject to any disclaimer, the term of this patent is extended or adjusted under 35 U.S.C. 154(b) by 383 days.

(21) Appl. No.: 15/153,260

(22) Filed: May 12, 2016

(65) Prior Publication Data
US 2016/0261095 A1    Sep. 8, 2016

Related U.S. Application Data

(63) Continuation of application No. PCT/EP2014/074365, filed on Nov. 12, 2014.

(30) Foreign Application Priority Data

Nov. 12, 2013 (WO) .............. PCT/EP2013/073613

(51) Int. Cl.
    H02B 1/26       (2006.01)
    H01B 3/56       (2006.01)
    H02B 13/055     (2006.01)
    H01H 33/22      (2006.01)
    H01H 33/56      (2006.01)

(52) U.S. Cl.
    CPC ............ H02B 1/26 (2013.01); H01B 3/56 (2013.01); H01H 33/22 (2013.01); H02B 13/055 (2013.01); H01H 2033/566 (2013.01)

(58) Field of Classification Search
    None
    See application file for complete search history.

(56) References Cited

U.S. PATENT DOCUMENTS 7,816,618 B2 * 10/2010 Uchii .................... H01H 33/56
                                                        218/43

FOREIGN PATENT DOCUMENTS

| EP | 1091182 A2 | 4/2001 |
| EP | 2445068 A1 | 6/2010 |
| EP | 2284854 A1 | 2/2011 |

OTHER PUBLICATIONS

European Patent Office, International Preliminary Report on Patentability issued in corresponding Application No. PCT/EP2014/074365, dated Dec. 1, 2015, 27 pp.

European Patent Office, International Search Report & Written Opinion issued in corresponding Application No. PCT/EP2014/074365, dated Feb. 9, 2015, 9 pp.

European Patent Office, International Search Report & Written Opinion issued in corresponding Application No. PCT/EP2013/073613, 9 pp.

* cited by examiner

*Primary Examiner* — Necholus Ogden, Jr.

(74) *Attorney, Agent, or Firm* — Taft Stettinius & Hollister LLP; J. Bruce Schelkopf

(57) ABSTRACT

The present invention relates to an electrical apparatus for generation, transmission, distribution and/or usage of electrical energy, comprising a housing enclosing an electrical apparatus interior space, at least a portion of which forms at least one insulation space having an electrical component and containing a surrounding insulation medium comprising an amount of carbon dioxide $m_{co2}$. The insulation space is formed by at least one insulation space compartment, in which an adsorber for reducing or eliminating the amount of water $m_{H2O}$ and optionally further contaminants from the insulation medium is arranged. The amount of adsorber $m_{ads}$ arranged in the at least one insulation space compartment complies with the formulae (I) and (II).

$$m_{ads} \geq \frac{m_{H_2O}}{k_{ads,H_2O}} \quad \text{(I)}$$

$$m_{ads} \leq 0.1 \frac{m_{CO_2}}{k_{ads,CO_2}} \quad \text{(II)}$$

32 Claims, No Drawings

WATER AND CONTAMINATION ABSORBER FOR C02 INSULATED ELECTRICAL APPARATUS FOR THE GENERATION, TRANSMISSION, DISTRIBUTION AND/OR USAGE OF ELECTRICAL ENERGY

The present invention relates to an electrical apparatus for the generation, transmission, distribution and/or usage of electrical energy, according to the preamble of the independent claims, and to a method for determining an optimum amount of an adsorber for the adsorption of water and optionally further contaminants in such an electrical apparatus.

In a wide variety of electrical apparatuses, such as switchgears, gas-insulated substations (GIS), gas-insulated lines (GIL) or transformers, a dielectric insulation media in liquid or gaseous state is conventionally used for the insulation of the electrical component comprised therein.

In medium or high voltage metal-encapsulated switchgears, for example, the electrical component is arranged in a housing, which encloses an insulating space, the insulation space comprising an insulation gas and separating the housing from the electrical component without letting electrical current to pass through and thereby providing dielectric insulation. For interrupting the current in high voltage switchgear, the insulating gas further functions as an arc extinction gas (hereinafter also referred to as "quenching gas").

Conventionally, sulphur hexafluoride ($SF_6$) has been used as an insulation medium or quenching gas, respectively. $SF_6$ is known for its high dielectric strength and thermal interruption capability. However, $SF_6$ might have some environmental impact when released into the atmosphere, in particular due to its high global warming potential (GWP) and its relatively long lifetime in the atmosphere.

So far, the relatively high GWP of $SF_6$ has been coped with by strict gas leakage control and by very careful gas handling. Nevertheless, there is an on-going effort in the development of alternative insulation media or quenching gases, respectively.

One particularly interesting candidate for substituting $SF_6$ is $CO_2$. $CO_2$ is readily available, non-toxic and non-flammable. A circuit breaker using $CO_2$ as a quenching gas for restraining its impact on global warming is e.g. described in U.S. Pat. No. 7,816,618. Furthermore, EP-A-2284854 proposes a mixed gas mainly comprising $CO_2$ and $CH_4$ as an arc-extinguishing medium.

To reduce or eliminate the presence of contaminants, in particular moisture (i.e. water) and/or decomposition products, present in the insulation medium, the electrical apparatus can further be provided with a contamination-reducing component. For example, adsorbers such as a zeolite are disclosed as contamination-reducing component. The intended use of a zeolite in an insulation gas containing $CO_2$ is disclosed in EP-A-2445068.

A zeolite has a selectivity that is primarily driven by its pore size. Therefore, the use of zeolite is only feasible, if the kinetic diameter of the insulation medium molecule(s) is significantly different from the one of the contaminant(s). If the kinetic diameter of the insulation gas molecule(s) is similar, co-adsorption of the insulation gas molecules can occur.

An adsorption of components of the insulation medium goes, however, along with a decrease in its insulation and arc extinction performance. This problem is particularly evident if the insulation medium comprises $CO_2$, since it has a kinetic diameter similar to the one of the water molecules to be removed and, thus, the pore size of the molecular sieve.

When using a zeolite with a pore diameter in a range between 0.2 and 0.5 nm, as suggested by EP-A-2445068, not only water but also $CO_2$ will be (co-)adsorbed, leading to a decrease in the insulation performance and arc extinction performance of the insulation medium.

Further problems arise from the fact that the adsorption of $CO_2$ to the zeolite is dependent on the temperature. A change in the temperature thus goes along with a change of the gas density of $CO_2$ and may cause a pressure swing of the dielectric insulation gas. Such a density change is further particularly disadvantageous, if the insulation medium is a mixture of different components, since in this case uniformity of the composition of the medium cannot be maintained over time. Moreover, detecting failure modes, such as gas leakage, during operation of the apparatus is rendered difficult, because a respective change in the composition and/or density of the insulation gas cannot be directly linked to a failure mode of the electrical apparatus, but might as well be a mere result of unwanted adsorption of $CO_2$ to the zeolite.

Considering these drawbacks, the problem of the present invention is thus to provide an electrical apparatus using a dielectric insulation medium comprising $CO_2$, said apparatus allowing a reduction or elimination of contaminants from the insulation medium without substantially interfering with its insulation and arc extinction performance.

This problem is solved by the subject matter according to the independent claims. Embodiments are given in the dependent claims and claim combinations and in the description in conjunction with the drawings.

According to a first aspect, the present invention thus relates to an electrical apparatus for the generation, transmission, distribution and/or usage of electrical energy, said electrical apparatus comprising
a housing enclosing an electrical apparatus interior space, at least a portion of the electrical apparatus interior space forming at least one insulation space, in which an electrical component is arranged and which contains an insulation medium surrounding said electrical component, the insulation medium comprising carbon dioxide,
the insulation space comprising, in particular being formed by, at least one insulation space compartment, in which an adsorber for reducing or eliminating the amount of water and optionally further contaminants from the insulation medium is arranged,
the amount of adsorber $m_{ads}$ arranged in at least one insulation space compartment, in particular in each insulation space compartment, complying with the following formula (I):

$$m_{ads} \geq \frac{m_{H_2O}}{k_{ads,H_2O}} \quad (I)$$

with
$m_{H2O}$ being the amount of water present in the respective insulation space compartment, and
$k_{ads,H2O}$ being the adsorption capability of the adsorber towards water at a predetermined temperature $T_0$;
wherein $m_{ads}$ further complies with the following formula (II)

$$m_{ads} \leq 0.1 \frac{m_{CO_2}}{k_{ads,CO_2}} \quad (II)$$

with $m_{CO2}$ being the amount of carbon dioxide ($CO_2$) present in the respective insulation space compartment; and $k_{ads,CO2}$ being the adsorption capability of the adsorber towards carbon dioxide at the predetermined temperature $T_0$.

Although unwanted, the presence of at least some water in the at least one insulation space compartment is almost impossible to avoid. Typically, water is thus present in the at least one insulation space compartment. The amount of water present can be determined, the methods for which are well known to the person skilled in the art.

According to the present invention, at least one and preferably each insulation space compartment is provided with an amount of adsorber specified to the actual needs. Thus, a very efficient removal of water and/or other contaminants can be achieved while at the same time keeping the influence of the adsorber on the insulation and arc-extinction performance of the insulation medium to an acceptable degree or to a minimum.

In more concrete terms, the lower limit of the amount of adsorber present in the insulation space compartment is defined by first formula (I), whereas the upper limit is defined by second formula (II). Accordingly, the amount of adsorber is on the one hand sufficient for removing water present in the insulation space compartment, and on the other hand is limited such that at most 10% of the carbon dioxide present in the insulation space compartment is adsorbed.

In embodiments, the amount of adsorber $m_{ads}$ is such that when introducing it into the insulation space compartment, the insulation medium undergoes a change in the partial pressure of $CO_2$ of less than 15%, preferably less than 10%, more preferably less than 5%, and most preferably less than 2%. Likewise, the change in the density of $CO_2$ is according to this embodiment less than 15%, preferably less than 10%, more preferably less than 5%, and most preferably less than 2%.

Consequently, the decrease in the insulation and arc extinction performance of the insulation medium is limited to an acceptable degree, and—if a gas mixture is used—the uniformity of the medium's composition is only affected unsubstantially.

This again allows for correct detecting failure modes, such as gas leakage, during operation by monitoring changes in the gas density and/or composition, since the changes can—when exceeding a certain degree (e.g. in percentage limits disclosed herein)—be reliably linked to the failure or abnormity.

The term "adsorption capability" as used in the context of the present invention refers to the amount (in kilogram) of the respective adsorbate, in the specific case the respective contaminant (in particular water), that can be adsorbed to a given amount (in kilogram) of adsorber. In other words, the "adsorption capability" refers to the amount of adsorbate the adsorber is capable to adsorb. Thus, an adsorption capability of 0.1 refers to 100 gram of adsorbate being adsorbed to 1 kilogram of adsorber.

The term "contaminants" as used herein encompasses both water and decomposition products. Among the contaminants, the amount of water typically dominates over the amount of decomposition products.

The adsorption capability is a characteristic specific to the material of the adsorber and in general is dependent on its temperature, as well as on the conditions the adsorber has been subjected to. As a rule, the adsorption capability is lower for an adsorber to which some adsorbate has already been adsorbed than for an adsorber which is free of adsorbate. For a given adsorber, the adsorption capability typically refers to the fresh material as received on the market. The respective information on the adsorption capability is known to the skilled person or is provided by the respective distributor.

As mentioned, the adsorption capability is dependent on the temperature and thus refers to a predetermined temperature $T_0$, specifically room temperature. In embodiments, the term "predetermined temperature" as used in the context of the present invention relates to the relevant temperature, more specifically to the average gas temperature at the operating condition of the electrical apparatus. Even more specifically, the predetermined temperature $T_0$ relates to room temperature and most specifically to standard ambient temperature, i.e. 298.15 K.

In particular, the predetermined temperature $T_0$, which relates to the temperature of the adsorber, can be chosen as follows. In determining the lower limit of the amount of adsorber $m_{ads}$ in formula (I) or (Ii) as disclosed in this application, the adsorption capability $k_{ads,H2O}$ typically decreases with increasing predetermined temperature $T_0$, and thus the minimal desired amount of adsorber $m_{ads}$ typically increases with increasing predetermined temperature $T_0$. For example, representative adsorber temperatures can lie between enclosure temperatures (e.g. 30° C. in normal operation or 60° C. in extreme operation) and gas temperatures or temperatures of current-carrying components (e.g. 50° C. in normal operation or 100° C. in extreme operation) and can thus for example be about 35-40° C. (normal operation) or about 80° C. (extreme operation).

Now, for determining the lower limit of the amount of adsorber $m_{ads}$ in formula (I) or (Ii), a predetermined temperature $T_0$ shall be chosen to be lower than the representative adsorber temperature, i.e. surely lower than about 80° C. and preferably lower than about 35-40° C. and more preferably about room temperature or standard ambient temperature, i.e. 298.15 K.

Typically, the adsorption capability of the adsorber towards carbon dioxide is also a decreasing function of temperature, and thus the maximal desired amount of adsorber $m_{ads}$ typically increases with increasing predetermined temperature $T_0$. Therefore, formula (II) is automatically fulfilled for all temperatures above the predetermined temperature $T_0$, as well. Therefore again, a predetermined temperature $T_0$ shall be chosen to be lower than the representative adsorber temperature, i.e. surely lower than about 80° C. and preferably lower than about 35-40° C. and more preferably about room temperature or standard ambient temperature, i.e. 298.15 K.

In embodiments, the actual amount of adsorber $m_{ads}$ is preferably chosen closer to the upper limit than to the lower limit. This results in tolerating larger, but still permissible pressure swings in carbon dioxide partial pressure and to increase the water absorption capacity of the adsorber $m_{ads}$.

In further embodiments of the independent claims, the amount of adsorber $m_{ads}$ arranged in the at least one insulation space compartment, in particular in each insulation space compartment, complies with the following formula (I):

$$m_{ads} \geq \frac{m_{H_2O}}{k_{ads,H_2O}} \tag{I}$$

with $m_{H2O}$ being the amount of water present in the respective insulation space compartment, and $k_{ads,H2O}$ being the adsorption capability of the adsorber towards water at a first predetermined temperature $T_1$; wherein $m_{ads}$ further complies with the following formula (II):

$$m_{ads} \leq 0.1 \frac{m_{CO_2}}{k_{ads,CO_2}} \quad (II)$$

with $m_{CO2}$ being the amount of carbon dioxide present in the respective insulation space compartment; and $k_{ads,CO2}$ being the adsorption capability of the adsorber towards carbon dioxide at a second predetermined temperature $T_2$.

In embodiments thereof, the first predetermined temperature $T_1$ is chosen higher than the second predetermined temperature $T_2$. This results in smaller ranges of permissible amounts of adsorber $m_{ads}$.

In further embodiments, the first predetermined temperature $T_1$ is chosen in analogy to above-mentioned $T_0$ to be lower than the representative adsorber temperature, i.e. surely lower than about 80° C. and preferably lower than about 35-40° C. and more preferably about room temperature or standard ambient temperature, i.e. 298.15 K. In particular, the first predetermined temperature $T_1$ is chosen equal to or higher than the (sole or combined) predetermined temperature $T_0$.

In further embodiments, the second predetermined temperature $T_1$ is chosen to be lower than the representative adsorber temperature, i.e. lower than about 35-40° C. and more preferably lower than room temperature, and most preferred equal or approximately equal to the minimal operating temperature of the electrical apparatus, for example −5° C. or −40° C. In particular, the second predetermined temperature $T_2$ is chosen smaller than the (sole or combined) predetermined temperature $T_0$. This results in smaller ranges of permissible amounts of adsorber $m_{ads}$.

All embodiments disclosed in this application, no matter whether apparatus or method, may as well apply to these configurations using a first and second predetermined temperature $T_1$ and $T_2$ instead of the (sole or combined) predetermined temperature $T_0$. In particular, the first and second predetermined temperature $T_1$ and $T_2$ can be chosen to be identical to one another and thus to be the predetermined temperature $T_0$.

During operation of the apparatus, the temperature of the adsorber is typically below the average temperature of the insulation medium, and in particular of the housing.

The adsorption capability is also dependent on the pressure or partial pressure of the respective adsorbate. For a given partial pressure of $CO_2$, the respective information on the adsorption capability is known to the skilled person or is provided by the respective distributor. With regard to $CO_2$ adsorption, the pressure dependency for a typical adsorber, such as a zeolite, is very low, once the $CO_2$ pressure is in the order of several bars, as is typically the case for the electrical apparatus according to the present invention.

Further, $k_{ads,CO2}$ is dependent on the amount of e.g. water adsorbed, i.e. the adsorption capability of the adsorber towards carbon dioxide decreases with increasing amount of water adsorbed. Given the fact that with time more water is adsorbed, $k_{ads,CO2}$ decreases with time. Thus, if initially the amount of adsorber $m_{ads}$ is chosen such that it complies with formula (II), this formula (II) will also be complied with when $k_{ads,CO2}$ decreases over time.

According to an embodiment, $k_{ads,CO2}$ thus relates to the initial $k_{ads,CO2}$, i.e. the adsorption capability of the adsorber towards carbon dioxide at the predetermined temperature $T_0$ at the time when placing the adsorber into the at least one insulation space compartment, in other words typically at the time when putting the electrical apparatus into operation or at the time of maintenance work on the electrical apparatus.

In analogy, in an embodiment $m_{H2O}$ relates to the initial $m_{H2O}$, i.e. to the amount of water present in the insulation space compartment at the time when placing the adsorber into the insulation space compartment.

In further analogy, $m_{CO2}$ relates to the amount of carbon dioxide present in the insulation space compartment at the time when placing the adsorber into the insulation space compartment.

In still further analogy, $k_{ads,H2O}$ relates to the adsorption capability of the adsorber towards water at predetermined temperature $T_0$ at the time when placing the adsorber into the insulation space compartment.

The expression "the amount of water present in the insulation space compartment" encompasses water in any state and in particularly also encompasses water present in a solid material, such as in polymeric material, that is directly exposed to the insulation space compartment, since this water typically diffuses out of the material into the insulation space compartment over time. According to embodiments, the term "the amount of water present in the insulation space compartment" thus also relates to water that is releasable into the insulation space compartment, in addition to the water already present in the insulation space compartment.

According to an embodiment, the adsorber is a moisture-reducing component. In the context of the present invention, the term "moisture-reducing component" is equivalent to the term "water-reducing component".

It is particularly preferred that the adsorber is a molecular sieve, more preferably a zeolite, i.e. a micro-porous aluminosilicate mineral that has undergone cation exchange to achieve a desired pore size. Zeolites are inexpensive and allow a great range of different contaminants to be adsorbed, even at elevated temperatures, particularly in a range of 40° to 80° C. Further preferred adsorbers enclose active charcoal and active alumina. Using any of these adsorbers allows for efficient removal of both water and decomposition products, such as HF.

In particular with regard to the adsorber being a molecular sieve, the term "adsorption capability" shall encompass any adsorption processes, such as physisorption and/or chemisorption. Physisorption can, in particular, be determined or be influenced by the relationship between the size of molecules of the insulation medium and the pore size of the adsorber, specifically of the molecular sieve. Chemisorption can, in particular, be determined or be influenced by chemical, typically reversal, interactions between molecules of the insulation medium and the adsorber, specifically the molecular sieve.

In embodiments the molecular sieve, particularly the zeolite, has an average pore size from 2 Å to 13 Å, preferably from 2 Å to 10 Å, even more preferably from 2 Å to 8 Å, most preferably from 2 Å to 5 Å. Molecular sieves having these pore sizes have been found to have a particularly high adsorption capacity and allow water and/or decomposition products, such as HF, to be efficiently adsorbed and thus to be removed from the insulation medium. The molecular sieve, and the zeolite in particular, having an average pore size of 5 Å at most is particularly preferred, since in embodiments in which the insulation medium comprises a fluoroketone, which will be described in detail below, the latter is not adsorbed. Further preferred is the molecular sieve, and the zeolite in particular, having an average pore size of 3 Å at most for its relatively low tendency to adsorb $CO_2$.

Suitable zeolites include e.g. ZEOCHEM® molecular sieve 3A (having a pore size of 3 Å), ZEOCHEM® molecular sieve 5A (having a pore size of 5 Å) and ZEOCHEM® molecular sieve 13× (having a pore size of 9 Å).

As mentioned, the term "adsorption" or "adsorbed" encompasses both physisorption and/or chemisorption. Physisorption can, in particular, be determined or be influenced by the relationship between the size of molecules of the insulation medium and the pore size of the molecular sieve. Chemisorption can, in particular, be determined or influenced by chemical interactions between molecules of the insulation medium and the molecular sieve.

The advantages of the present invention are particularly pronounced in an embodiment, in which the insulation space is formed by at least two insulation space compartments separated from each other, because the invention allows to keep the influence of the adsorber on the insulation and arc-extinction performance of the insulation medium to a minimum, which is not the case if a standard amount is used for all compartments without taking into account the different needs present in the specific compartments. This is of particular relevance, if the compartments significantly differ from each other in the amount of water being present or released and/or the amount of decomposition products being generated. This can for example be the case for a circuit breaker compartment in comparison to a non-circuit-breaker-component compartment (in other words a purely current-conducting-component compartment or a compartment comprising at most an earthing switch and/or a disconnector, but not a circuit breaker with nominal and overcurrent interruption capability; or yet in other words a compartment, which does not contain a circuit breaker or a component thereof), or for insulation space compartments having significantly different volumes.

In other words, with regard to these embodiments, the feature that the at least two insulation space compartments are separated from each other means that they are not in fluid connection with each other.

In such embodiments, it is particularly preferred that the volumes of the at least two insulation space compartments differ from one another by a factor of at least 1.5, more preferably at least 7, and most preferably at least 50.

According to a preferred embodiment, the at least one insulation space compartment comprises a volume-specific amount of less than 5 kg adsorber per cubic meter, preferably less than 1.25 kg adsorber per cubic meter, more preferably less than 0.25 kg adsorber per cubic meter, and most preferably less than 0.125 kg adsorber per cubic meter of the volume of the insulation space compartment.

If the electrical component is a non-circuit-breaker component, it is preferred that the at least one insulation space compartment comprises a volume-specific amount of less than 2 kg adsorber per cubic meter, preferably less than 0.5 kg adsorber per cubic meter, more preferably less than 0.1 kg adsorber per cubic meter, and most preferably less than 0.05 adsorber per kg per cubic meter of the volume of the insulation space compartment.

Assuming an adsorption capability $k_{ads,CO2}$ of about 0.2 for a molecular sieve, the maximum amount of molecular sieve present in an insulation space compartment of 10 standard m³ (bar·m³) with an assumed density of $CO_2$ of about 2 kg/m³, is thus about 10 kg. It is understood that the maximum amount of adsorber can be higher or lower depending on its adsorption capability $k_{ads,CO2}$ towards carbon dioxide.

Additionally or alternatively to the molecular sieve, the electrical apparatus can comprise a desiccant selected from the group consisting of: calcium, calcium sulphate, in particular drierite, calcium carbonate, calcium hydride, calcium chloride, potassium carbonate, potassium hydroxide, copper (II) sulphate, calcium oxide, magnesium, magnesium oxide, magnesium sulphate, magnesium perchlorate, sodium, sodium sulphate, aluminium, lithium aluminium hydride, aluminium oxide, activated alumina, montmorrilonite, phosphorpentoxide, silica gel and a cellulose filter, as well as mixtures thereof.

As mentioned, the insulation medium comprises carbon dioxide ($CO_2$). By the term "comprises", embodiments are encompassed in which the insulation medium consists or essentially consists of carbon dioxide. In this embodiment, carbon dioxide is thus the sole component of the insulation medium.

Alternatively, the insulation medium can comprise carbon dioxide apart from other constituents and thus form a gas mixture, which is an often preferred embodiment. It is particularly preferred that the insulation medium comprises—apart from carbon dioxide—air or at least one air component, in particular selected from the group consisting of oxygen and nitrogen and mixtures thereof.

According to a preferred embodiment, the insulation medium comprises a mixture of carbon dioxide and oxygen. According to a particularly preferred embodiment, the ratio of the amount of carbon dioxide to the amount of oxygen can thereby range from 50:50 to 100:1.

In particular in view of interrupting the current in a high voltage switchgear, it is a further embodiment that the ratio of the amount of carbon dioxide to the amount of oxygen ranges from 80:20 to 95:5, more preferably from 85:15 to 92:8, even more preferably from 87:13 to less than 90:10, and in particular is about 89:11. In this regard, it has been found on the one hand that oxygen being present in a molar fraction of at least 5% cannot sufficiently suppress soot formation which is to be prevented even after repeated current interruption events with high current arcing. On the other hand, oxygen being present in a molar fraction of at most 20%, more particularly of at most 15%, reduces the risk of degradation of the material of the electrical apparatus by oxidation.

According to a further preferred embodiment, the insulation medium additionally comprises an organofluorine compound, since it has been found that these contribute to very high insulation capabilities, in particular a high dielectric strength (or breakdown field strength), and at the same time have a low GWP and low toxicity. The advantages achievable by the present invention are of particular relevance in this embodiment, since water is efficiently removed, which might otherwise open reaction pathways with the organofluorine compound to generate decomposition products. The generation of e.g. hydrogen fluoride, which is extremely toxic and corrosive, can thus efficiently be avoided.

In particular, the organofluorine compound is selected from the group consisting of: fluoroethers, in particular hydrofluoromonoethers, fluoroketones, in particular perfluoroketones, fluoroolefins, in particular hydrofluoroolefins, fluoronitriles, in particular perfluoronitriles, and mixtures thereof, since these classes of compounds have been found to have very high insulation capabilities, in particular a high dielectric strength (or breakdown field strength) and at the same time a low GWP and low toxicity.

The invention encompasses both embodiments in which the dielectric insulation gas comprises either one of a fluoroether, in particular a hydrofluoromonoether, a fluoroketone and a fluoroolefin, in particular a hydrofluoroolefin, as well as embodiments in which it comprises a mixture of at least two of these compounds.

The term "fluoroether" as used in the context of the present invention encompasses both perfluoroethers, i.e. fully fluorinated ethers, and hydrofluoroethers, i.e. ethers that are only partially fluorinated. The term "fluoroether" further encompasses saturated compounds as well as unsaturated compounds, i.e. compounds including double and/or triple bonds between carbon atoms. The at least partially fluorinated alkyl chains attached to the oxygen atom of the fluoroether can, independently of each other, be linear or branched.

The term "fluoroether" further encompasses both non-cyclic and cyclic ethers. Thus, the two alkyl chains attached to the oxygen atom can optionally form a ring. In particular, the term encompasses fluorooxiranes. In a specific embodiment, the organofluorine compound according to the present invention is a perfluorooxirane or a hydrofluorooxirane, more specifically a perfluorooxirane or hydrofluorooxirane comprising from three to fifteen carbon atoms.

It is preferred that the dielectric insulation gas comprises a hydrofluoromonoether containing at least three carbon atoms. Apart from their high dielectric strength, these hydrofluoromonoethers are chemically and thermally stable up to temperatures above 140° C. They are further non-toxic or have a low toxicity level. In addition, they are non-corrosive and non-explosive.

The term "hydrofluoromonoether" as used herein refers to a compound having one and only one ether group, said ether group linking two alkyl groups, which can be, independently from each other, linear or branched, and which can optionally form a ring. The compound is thus in clear contrast to the compounds disclosed in e.g. U.S. Pat. No. 7,128,133, which relates to the use of compounds containing two ether groups, i.e. hydrofluorodiethers, in heat-transfer fluids.

The term "hydrofluoromonoether" as used herein is further to be understood such that the monoether is partially hydrogenated and partially fluorinated. It is further to be understood such that it may comprise a mixture of differently structured hydrofluoromonoethers. The term "structurally different" shall broadly encompass any difference in sum formula or structural formula of the hydrofluoromonoether.

As mentioned above, hydrofluoromonoethers containing at least three carbon atoms have been found to have a relatively high dielectric strength. Specifically, the ratio of the dielectric strength of the hydrofluoromonoethers according to the present invention to the dielectric strength of $SF_6$ is greater than about 0.4.

As also mentioned, the GWP of the hydrofluoromonoethers is low. Preferably, the GWP is less than 1,000 over 100 years, more specifically less than 700 over 100 years.

The hydrofluoromonoethers mentioned herein have a relatively low atmospheric lifetime and in addition are devoid of halogen atoms that play a role in the ozone destruction catalytic cycle, namely Cl, Br or I. Their Ozone Depletion Potential (ODP) is zero, which is very favourable from an environmental perspective.

The preference for a hydrofluoromonoether containing at least three carbon atoms and thus having a relatively high boiling point of more than −20° C. is based on the finding that a higher boiling point of the hydrofluoromonoether generally goes along with a higher dielectric strength.

According to other embodiments, the hydrofluoromonoether contains exactly three or four or five or six carbon atoms, in particular exactly three or four carbon atoms, most preferably exactly three carbon atoms.

More particularly, the hydrofluoromonoether is thus at least one compound selected from the group consisting of the compounds defined by the following structural formulae in which a part of the hydrogen atoms is each substituted by a fluorine atom:

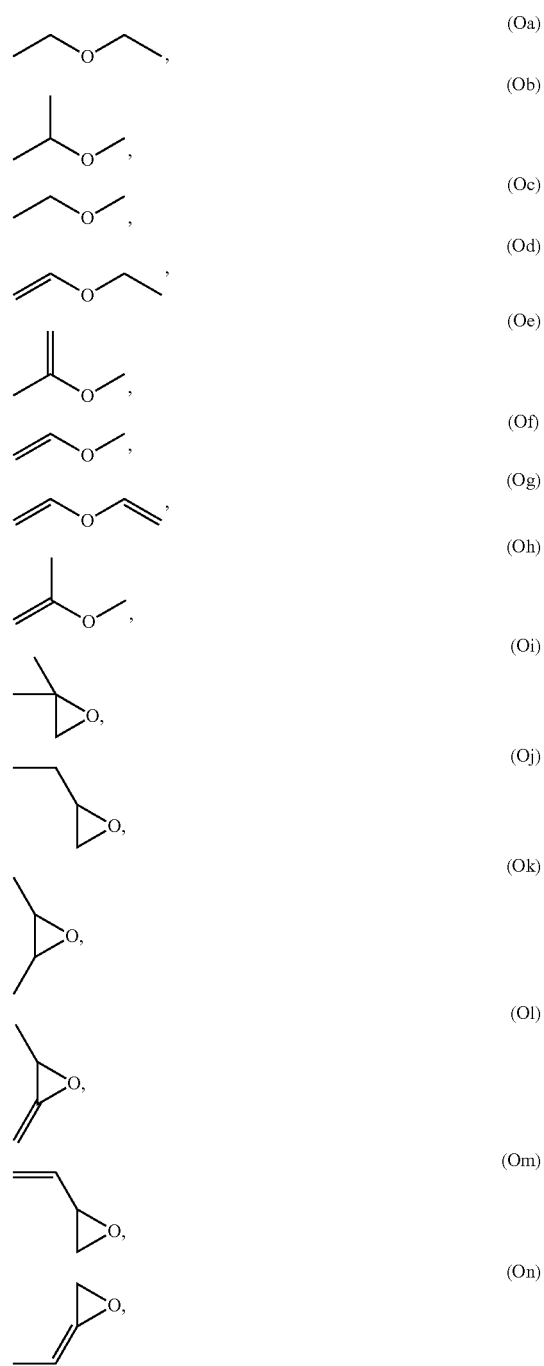

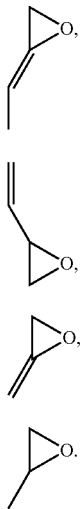

(Oo)

(Op)

(Oq)

(Or)

By using a hydrofluoromonoether containing three or four carbon atoms, no liquefaction occurs under typical operational conditions of the apparatus. Thus, a dielectric insulation medium, every component of which is in the gaseous state at operational conditions of the apparatus, can be achieved.

Considering flammability of the compounds, it is further advantageous that the ratio of the number of fluorine atoms to the total number of fluorine and hydrogen atoms, here briefly called "F-rate", of the hydrofluoromonoether is at least 5:8. It has been found that compounds falling within this definition are generally non-flammable and thus result in an insulation medium complying with highest safety requirements. Thus, safety requirements of the electrical insulator and the method of its production can readily be fulfilled by using a corresponding hydrofluoromonoether.

According to other embodiments, the ratio of the number of fluorine atoms to the number of carbon atoms, here briefly called "F/C-ratio", ranges from 1.5:1 to 2:1. Such compounds generally have a GWP of less than 1,000 over 100 years and are thus very environment-friendly. It is particularly preferred that the hydrofluoromonoether has a GWP of less than 700 over 100 years.

According to other embodiments of the present invention, the hydrofluoromonoether has the general structure (O)

(O)

wherein a and d independently are an integer from 1 to 3 with a+d=3 or 4 or 5 or 6, in particular 3 or 4, b and c independently are an integer from 0 to 11, in particular 0 to 7, with b+c=2a+1, and e and f independently are an integer from 0 to 11, in particular 0 to 7, with e+f=2d+1, with further at least one of b and e being 1 or greater and at least one of c and f being 1 or greater.

It is thereby a preferred embodiment that in the general structure or formula (O) of the hydrofluoromonoether: a is 1, b and c independently are an integer ranging from 0 to 3 with b+c=3, d=2, e and f independently are an integer ranging from 0 to 5 with e+f=5, with further at least one of b and e being 1 or greater and at least one of c and f being 1 or greater.

According to a more particular embodiment, exactly one of c and f in the general structure (O) is 0. The corresponding grouping of fluorines on one side of the ether linkage, with the other side remaining unsubstituted, is called "segrega-tion". Segregation has been found to reduce the boiling point compared to unsegregated compounds of the same chain length. This feature is thus of particular interest, because compounds with longer chain lengths allowing for higher dielectric strength can be used without risk of liquefaction under operational conditions.

Most preferably, the hydrofluoromonoether is selected from the group consisting of pentafluoro-ethyl-methyl ether ($CH_3$—O—$CF_2CF_3$) and 2,2,2-trifluoroethyl-trifluoromethyl ether ($CF_3$—O—$CH_2CF_3$).

Pentafluoro-ethyl-methyl ether has a boiling point of +5.25° C. and a GWP of 697 over 100 years, the F-rate being 0.625, while 2,2,2-trifluoroethyl-trifluoromethyl ether has a boiling point of +11° C. and a GWP of 487 over 100 years, the F-rate being 0.75. They both have an ODP of 0 and are thus environmentally fully acceptable.

In addition, pentafluoro-ethyl-methyl ether has been found to be thermally stable at a temperature of 175° C. for 30 days and therefore to be fully suitable for the operational conditions given in the apparatus. Since thermal stability studies of hydrofluoromonoethers of higher molecular weight have shown that ethers containing fully hydrogenated methyl or ethyl groups have a lower thermal stability compared to those having partially hydrogenated groups, it can be assumed that the thermal stability of 2,2,2-trifluoro-ethyl-trifluoromethyl ether is even higher.

Hydrofluoromonoethers in general, and pentafluoro-ethyl-methyl ether as well as 2,2,2-trifluoroethyl-trifluoromethyl ether in particular, display a low risk of human toxicity. This can be concluded from the available results of mammalian HFC (hydrofluorocarbon) tests. Also, information available on commercial hydrofluoromonoethers do not give any evidence of carcinogenicity, mutagenicity, reproductive/developmental effects and other chronic effects of the compounds of the present application.

Based on the data available for commercial hydrofluoro ethers of higher molecular weight, it can be concluded that the hydrofluoromonoethers, and in particular pentafluoro-ethyl-methyl ether as well as 2,2,2-trifluoroethyl-trifluoromethyl ether, have a lethal concentration LC 50 of higher than 10,000 ppm, rendering them suitable also from a toxicological point of view.

The hydrofluoromonoethers mentioned have a higher dielectric strength than air. In particular, pentafluoro-ethyl-methyl ether at 1 bar has a dielectric strength about 2.4 times higher than that of air at 1 bar.

Given its boiling point, which is preferably below 55° C., more preferably below 40° C., in particular below 30° C., the hydrofluoromonoethers mentioned, particularly pentafluoro-ethyl-methyl ether and 2,2,2-trifluoroethyl-trifluoromethyl ether, respectively, are normally in the gaseous state at operational conditions. Thus, a dielectric insulation medium in which every component is in the gaseous state at operational conditions of the apparatus can be achieved, which is advantageous.

Alternatively or additionally to the hydrofluoromonoethers mentioned above, the dielectric insulation gas comprises a fluoroketone containing from four to twelve carbon atoms.

The term "fluoroketone" as used in this application shall be interpreted broadly and shall encompass both perfluoroketones and hydrofluoroketones, and shall further encompass both saturated compounds and unsaturated compounds, i.e. compounds including double and/or triple bonds between carbon atoms. The at least partially fluorinated alkyl chain of the fluoroketones can be linear or branched, or can form a ring, which optionally is substituted by one or more alkyl groups. In exemplary embodiments, the fluoroketone is a perfluoroketone. In further exemplary embodiment, the fluoroketone has a branched alkyl chain, in particular an at least partially fluorinated alkyl chain. In still further exemplary embodiments, the fluoroketone is a fully saturated compound.

According to another aspect, the present invention also relates to a dielectric insulation medium comprising a fluoroketone having from 4 to 12 carbon atoms, the at least partially fluorinated alkyl chain of the fluoroketone forming a ring, which is optionally substituted by one or more alkyl groups.

It is particularly preferred that the insulation medium comprises a fluoroketone containing exactly five or exactly six carbon atoms or mixtures thereof.

Compared to fluoroketones having a greater chain length with more than six carbon atoms, fluoroketones containing five or six carbon atoms have the advantage of a relatively low boiling point. Thus, problems which might go along with liquefaction can be avoided, even when the apparatus is used at low temperatures.

According to embodiments, the fluoroketone is at least one compound selected from the group consisting of the compounds defined by the following structural formulae in which at least one hydrogen atom is substituted with a fluorine atom:

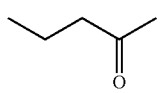
(Ia)

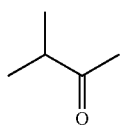
(Ib)

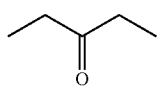
(Ic)

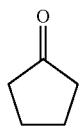
(Id)

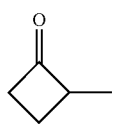
(Ie)

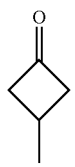
(If)

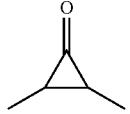
(Ig)

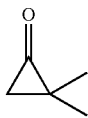
(Ih)

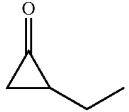
(Ii)

Fluoroketones containing five or more carbon atoms are further advantageous, because they are generally non-toxic with outstanding margins for human safety. This is in contrast to fluoroketones having less than four carbon atoms, such as hexafluoroacetone (or hexafluoropropanone), which are toxic and very reactive. In particular, fluoroketones containing exactly five carbon atoms, herein briefly named fluoroketones a), and fluoroketones containing exactly six carbon atoms are thermally stable up to 500° C.

In embodiments of this invention, the fluoroketones, in particular fluoroketones a), having a branched alkyl chain are preferred, because their boiling points are lower than the boiling points of the corresponding compounds (i.e. compounds with same molecular formula) having a straight alkyl chain.

According to embodiments, the fluoroketone a) is a perfluoroketone, in particular has the molecular formula $C_5F_{10}O$, i.e. is fully saturated without double or triple bonds between carbon atoms. The fluoroketone a) may more preferably be selected from the group consisting of 1,1,1,3,4,4,4-heptafluoro-3-(trifluoromethyl)butan-2-one (also named decafluoro-2-methylbutan-3-one), 1,1,1,3,3,4,4,5,5,5-decafluoropentan-2-one, 1,1,1,2,2,4,4,5,5,5-decafluoropentan-3-one and octafluorocylcopentanone, and most preferably is 1,1,1,3,4,4,4-heptafluoro-3-(trifluoromethyl)butan-2-one.

1,1,1,3,4,4,4-heptafluoro-3-(trifluoromethyl)butan-2-one can be represented by the following structural formula (I):

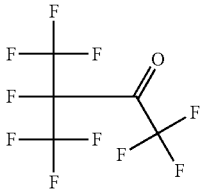
(I)

1,1,1,3,4,4,4-heptafluoro-3-(trifluoromethyl)butan-2-one, here briefly called "C5-ketone", with molecular formula $CF_3C(O)CF(CF_3)_2$ or $C_5F_{10}O$, has been found to be particularly preferred for high and medium voltage insulation applications, because it has the advantages of high dielectric insulation performance, in particular in mixtures with a dielectric carrier gas, has very low GWP and has a low boiling point. It has an ODP of 0 and is practically non-toxic.

According to embodiments, even higher insulation capabilities can be achieved by combining the mixture of different fluoroketone components. In embodiments, a fluoroketone containing exactly five carbon atoms, as described above and here briefly called fluoroketone a), and a fluoroketone containing exactly six carbon atoms or exactly seven carbon atoms, here briefly named fluoroketone c), can favourably be part of the dielectric insulation at the same time. Thus, an insulation medium can be achieved having more than one fluoroketone, each contributing by itself to the dielectric strength of the insulation medium.

In embodiments, the further fluoroketone c) is at least one compound selected from the group consisting of the compounds defined by the following structural formulae in which at least one hydrogen atom is substituted with a fluorine atom:

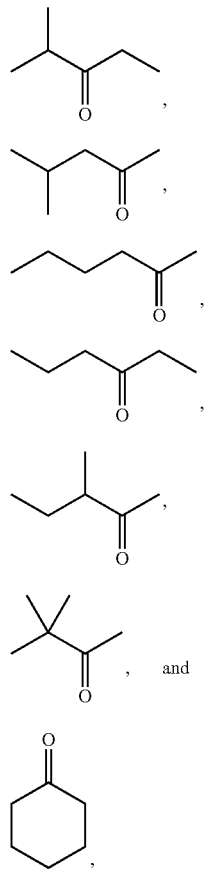

(IIa), (IIb), (IIc), (IId), (IIe), (IIf), and

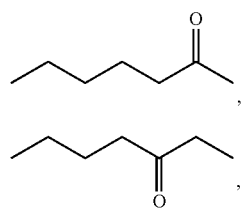

(IIg)

as well as any fluoroketone having exactly 6 carbon atoms, in which the at least partially fluorinated alkyl chain of the fluoroketone forms a ring, which is substituted by one or more alkyl groups (IIh);
and/or is at least one compound selected from the group consisting of the compounds defined by the following structural formulae in which at least one hydrogen atom is substituted with a fluorine atom:

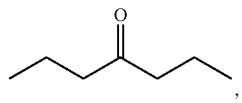
(IIIa)

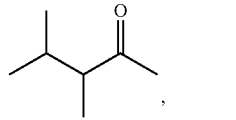
(IIIb)

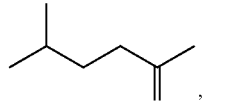
(IIIc)

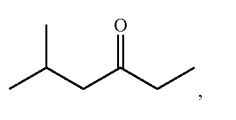
(IIId)

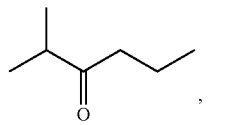
(IIIe)

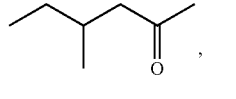
(IIIf)

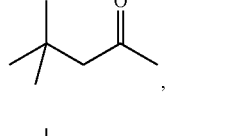
(IIIg)

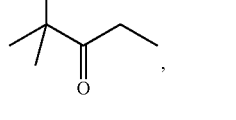
(IIIh)

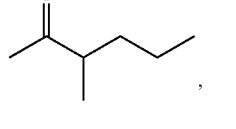
(IIIi)

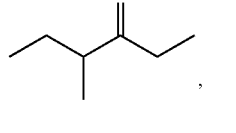
(IIIj)

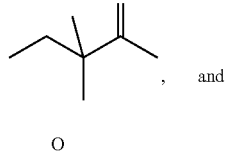
(IIIk)

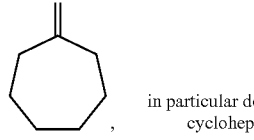
(IIIl)

, and (IIIm)

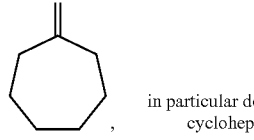
(IIIn)

, in particular dodecafluoro-cycloheptanone, as well as any fluoroketone having exactly 7 carbon atoms, in which the at least partially fluorinated alkyl chain of the fluoroketone forms a ring, which is substituted by one or more alkyl groups (IIIo).

The present invention encompasses, in particular, each combination of any of the compounds according to structural formulae (Ia) to (Id) with any of the compounds according to structural formulae (IIa) to (IIg) and/or (IIIa) to (IIIn). As well, the present invention encompasses each compound or each combination of compounds selected from the group consisting of the compounds according to structural formulae (Ia) to (Ii), (IIa) to (IIh), (IIIa) to (IIIo), and mixtures thereof.

According to another aspect, the present invention relates to a dielectric insulation medium comprising a fluoroketone having exactly 6 carbon atoms, in which the at least partially fluorinated alkyl chain of the fluoroketone forms a ring, optionally substituted by one or more alkyl groups. Furthermore, such dielectric insulation medium can comprise a background gas, in particular selected from the group consisting of: air, air component, nitrogen, oxygen, carbon dioxide, a nitrogen oxide (in particular—i.e. including but not limited to—$NO_2$, NO, $N_2O$), and mixtures thereof. Furthermore, an electrical apparatus comprising such a dielectric insulation medium is disclosed.

According to still another aspect, the present invention relates to a dielectric insulation medium comprising a fluoroketone having exactly 7 carbon atoms, in which the at least partially fluorinated alkyl chain of the fluoroketone forms a ring, optionally substituted by one or more alkyl groups. Furthermore, such dielectric insulation medium can comprise a background gas, in particular selected from the group consisting of: air, air component, nitrogen, oxygen, carbon dioxide, a nitrogen oxide (including but not limited to $NO_2$, NO, $N_2O$), and mixtures thereof. Furthermore, an electrical apparatus comprising such a dielectric insulation medium is disclosed.

The present invention encompasses any dielectric insulation medium comprising each compound or each combination of compounds selected from the group consisting of the compounds according to structural formulae (Ia) to (Ii), (IIa) to (IIg) or to (IIh), (IIIa) to (IIIn) or to (IIIo), and mixtures thereof, and with the dielectric insulation medium further comprising a background gas, in particular selected from the group consisting of: air, air component, nitrogen, oxygen, carbon dioxide, a nitrogen oxide (including but not limited to $NO_2$, NO, $N_2O$), and mixtures thereof. Furthermore, an electrical apparatus comprising such a dielectric insulation medium is disclosed.

Depending on the specific application of the apparatus of the present invention, a fluoroketone containing exactly six carbon atoms (falling under the designation "fluoroketone c)" mentioned above) may be preferred; such a fluoroketone is non-toxic, with outstanding margins for human safety.

In embodiments, fluoroketone c), alike fluoroketone a), is a perfluoroketone, and/or has a branched alkyl chain, in particular an at least partially fluorinated alkyl chain, and/or the fluoroketone c) contains fully saturated compounds. In particular, the fluoroketone c) has the molecular formula $C_6F_{12}O$, i.e. is fully saturated without double or triple bonds between carbon atoms. More preferably, the fluoroketone c) can be selected from the group consisting of 1,1,1,2,4,4,5,5,5-nonafluoro-2-(trifluoromethyl)pentan-3-one (also named dodecafluoro-2-methylpentan-3-one), 1,1,1,3,3,4,5,5,5-nonafluoro-4-(trifluoromethyl)pentan-2-one (also named dodecafluoro-4-methylpentan-2-one), 1,1,1,3,4,4,5,5,5-nonafluoro-3-(trifluoromethyl)pentan-2-one (also named dodecafluoro-3-methylpentan-2-one), 1,1,1,4,4,4-hexafluoro-3,3-bis-(trifluoromethyl)butan-2-one (also named dodecafluoro-3,3-(dimethyl)butan-2-one), dodecafluorohexan-2-one, dodecafluorohexan-3-one and decafluorocyclohexanone, and particularly is the mentioned 1,1,1,2,4,4,5,5,5-nonafluoro-2-(trifluoromethyl)pentan-3-one.

1,1,1,2,4,4,5,5,5-Nonafluoro-2-(trifluoromethyl)pentan-3-one (also named dodecafluoro-2-methylpentan-3-one) can be represented by the following structural formula (II):

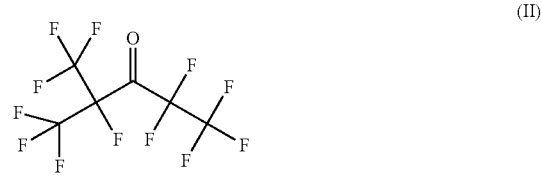 [SMILES: O=C(C(F)(F)C(F)(F)F)C(F)(C(F)(F)F)C(F)(F)F]

1,1,1,2,4,4,5,5,5-Nonafluoro-4-(trifluoromethyl)pentan-3-one (here briefly called "C6-ketone", with molecular formula $C_2F_5C(O)CF(CF_3)_2$) has been found to be particularly preferred for high voltage insulation applications because of its high insulating properties and its extremely low GWP. Specifically, its pressure-reduced breakdown field strength is around 240 kV/(cm*bar), which is much higher than the one of air having a much lower dielectric strength ($E_{cr}$=25 kV/(cm*bar). It has an ozone depletion potential of 0 and is non-toxic (LC50 of about 100,000 ppm). Thus, the environmental impact is much lower than when using $SF_6$, and at the same time outstanding margins for human safety are achieved.

As mentioned above, the organofluorine compound can also be a fluoroolefin, in particular a hydrofluoroolefin. More particularly, the fluoroolefin or hydrofluoroolefin, respectively, contains exactly three carbon atoms.

According to an embodiment, the hydrofluoroolefin is thus selected from the group consisting of: 1,1,1,2-tetrafluoropropene (HFO-1234yf), 1,2,3,3-tetrafluoro-2-propene (HFO-1234yc), 1,1,3,3-tetrafluoro-2-propene (HFO-1234zc), 1,1,1,3-tetrafluoro-2-propene (HFO-1234ze), 1,1,2,3-tetrafluoro-2-propene (HFO-1234ye), 1,1,1,2,3-pentafluoropropene (HFO-1225ye), 1,1,2,3,3-pentafluoropropene (HFO-1225yc), 1,1,1,3,3-pentafluoropropene (HFO-1225zc), (Z)1,1,1,3-tetrafluoropropene (HFO-1234zeZ), (Z)1,1,2,3-tetrafluoro-2-propene (HFO-1234yeZ), (E)1,1,1,3-tetrafluoropropene (HFO-1234zeE), (E)1,1,2,3-tetrafluoro-2-propene (HFO-1234yeE), (Z)1,1,1,2,3-pentafluoropropene (HFO-1225yeZ), (E)1,1,1,2,3-pentafluoropropene (HFO-1225yeE) and combinations thereof.

As mentioned above, the organofluorine compound can also be a fluoronitrile, in particular a perfluoronitrile. In particular, the organofluorine compound can be a fluoronitrile, specifically a perfluoronitrile, containing two carbon atoms, three carbon atoms or four carbon atoms. More particularly, the fluoronitrile can be a perfluoroalkylnitrile, specifically perfluoroacetonitrile, perfluoropropionitrile ($C_2F_5CN$) and/or perfluorobutyronitrile ($C_3F_7CN$).

Most particularly, the fluoronitrile can be perfluoroisobutyronitrile (according to the formula $(CF_3)_2CFCN$) and/or perfluoro-2-methoxypropanenitrile (according to the formula $CF_3CF(OCF_3)CN$). Of these, perfluoroisobutyronitrile is particularly preferred due to its low toxicity.

In order to further guarantee for the integrity of the insulation medium, the housing preferably encloses the insulation space in a gas-tight manner.

In embodiments, the amount of adsorber $m_{ads}$ arranged in the at least one insulation space compartment, in particular in each insulation space compartment, complies with the following formula (Ii):

$$m_{ads} \geq \frac{m_{H_2O}}{k_{ads,H_2O}} + \sum_{i=1}^{n} \frac{m_{dp_i}}{k_{ads,dp_i}} \quad \text{(Ii)}$$

with $m_{dpi}$ being the amount of a respective decomposition product $dp_1$, $dp_2$, ... $dp_n$ present in the insulation medium, with i being an index for the i-th decomposition product, and $k_{ads,dpi}$ being the adsorption capability of the adsorber towards the respective i-th decomposition product $dp_1$, $dp_2$, ... $dp_n$ at the predetermined temperature $T_0$ (or first predetermined temperature $T_1$ in embodiments mentioning first and second predetermined temperatures $T_1$, $T_2$ instead of $T_0$).

In these embodiments, at least one decomposition product is taken into account as further contaminant, in addition to the water present in the insulation space compartment. Specifically, the at least one decomposition product is a decomposition product of the organofluorine compound optionally contained in the insulation medium, and more specifically the decomposition product of a fluoroketone.

Typically, $m_{dpi}$ relates to the amount of the respective i-th decomposition product created in and/or released into the respective insulation space compartment, e.g. between gas maintenance or gas replacement intervals.

According to a further preferred embodiment, the electrical apparatus is a high voltage or medium voltage apparatus. Preferably, the electrical apparatus is a part of or is a: high voltage apparatus, medium voltage apparatus, low voltage apparatus, direct-current apparatus, switchgear, air-insulated switchgear, part or component of air-insulated switchgear, gas-insulated metal-encapsulated switchgear (GIS), part or component of gas-insulated metal-encapsulated switchgear, air-insulated transmission line, gas-insulated transmission line (GIL), bus bar, bushing, air-insulated insulator, gas-insulated metal-encapsulated insulator, cable, gas-insulated cable, cable joint, current transformer, voltage transformer, sensors, surge arrester, capacitor, inductance, resistor, current limiter, high voltage switch, earthing switch, disconnector, load-break switch, circuit breaker, gas circuit breaker, vacuum circuit breaker, generator circuit breaker, medium voltage switch, ring main unit, recloser, sectionalizer, low voltage switch, transformer, distribution transformer, power transformer, tap changer, transformer bushing, electrical rotating machine, generator, motor, drive, semiconducting device, power semiconductor device, power converter, computing machine; and components and/or combinations of such devices.

According to a second aspect, the present invention independently also relates to an electrical apparatus for the generation, transmission, distribution and/or usage of electrical energy, said electrical apparatus comprising
a housing enclosing an electrical apparatus interior space, at least a portion of said electrical apparatus interior space forming at least one insulation space, in which an electrical component is arranged and which contains an insulation medium surrounding said electrical component, the insulation medium comprising carbon dioxide,
the insulation space comprising, in particular being formed by, at least one insulation space compartment, in which an adsorber for reducing or eliminating an amount of water and optionally further contaminants from the insulation medium is arranged,
wherein the at least one insulation space compartment comprises a volume-specific amount of less than 5 kg adsorber per cubic meter, preferably less than 1.25 kg adsorber per cubic meter, more preferably less than 0.25 kg adsorber per cubic meter, and most preferably less than 0.125 kg adsorber per cubic meter of the volume of the insulation space compartment.

If the electrical component is a non-circuit-breaker component, it is particularly preferred that the at least one insulation space compartment comprises a volume-specific amount of less than 2 kg adsorber per cubic meter, preferably less than 0.5 kg adsorber per cubic meter, more preferably less than 0.1 kg adsorber per cubic meter, and most preferably less than 0.05 kg adsorber per cubic meter of the volume of the insulation space compartment, thus keeping the influence of the adsorber on the insulation performance of the insulation medium to a minimum.

The preferred features disclosed above in relation to the first aspect likewise apply to the second aspect of the present invention.

According to a further aspect, the present invention also relates to a method for determining an optimum amount of an adsorber for the adsorption of water and optionally further contaminants in an electrical apparatus for the generation, transmission, distribution and/or usage of electrical energy, said electrical apparatus comprising a housing enclosing an electrical apparatus interior space, at least a portion of the electrical apparatus interior space forming at least one insulation space, in which an electrical component is arranged and which contains an insulation medium surrounding the electrical component, the insulation medium comprising carbon dioxide, the insulation space comprising at least one insulation space compartment, the method comprising the steps or method elements of
a) determining for at least one insulation space compartment the amount of water $m_{H2O}$ present in the insulation space compartment;
b) determining for the at least one insulation space compartment the amount of carbon dioxide $m_{CO2}$ present in the insulation space compartment;
c) determining for the at least one insulation space compartment the lower limit of the amount of adsorber $m_{ads}$ by formula (I)

$$m_{ads} \geq \frac{m_{H_2O}}{k_{ads,H_2O}} \quad \text{(I)}$$

and
d) determining for the at least one insulation space compartment the upper limit of the amount of adsorber $m_{ads}$ by formula (II)

$$m_{ads} \leq 0.1 \frac{m_{CO_2}}{k_{ads,CO_2}} \quad \text{(II)}$$

with
$k_{ads,H2O}$ being the adsorption capability of the adsorber towards water at a predetermined temperature $T_0$; and
$k_{ads,CO2}$ being the adsorption capability of the adsorber towards carbon dioxide at the predetermined temperature $T_0$.

It is understood that the preferred features disclosed above in relation to the electrical apparatus likewise apply to the method of the present invention and vice versa.

Specifically, $m_{H2O}$ relates to the amount of water present in the insulation space compartment at the time of or immediately before placing the adsorber into the insulation space compartment and $k_{ads,CO2}$ relates to the adsorption capability of the adsorber towards carbon dioxide at the predetermined temperature $T_0$ at the time of or immediately before placing the adsorber into the insulation space compartment.

Specifically, the amount of adsorber $m_{ads}$ is such that when introducing it into the insulation space compartment, the insulation medium undergoes a change in the partial pressure of $CO_2$ of less than 15%, preferably less than 10%, more preferably less than 5%, and most preferably less than 2%. Likewise, the change in the density of $CO_2$ is according to this embodiment less than 15%, preferably less than 10%, more preferably less than 5%, and most preferably less than 2%.

In embodiments, the lower limit of the amount of adsorber $m_{ads}$ for the at least one insulation space compartment, in particular each insulation space compartment, specifically complies with the following formula (Ii):

$$m_{ads} \geq \frac{m_{H_2O}}{k_{ads,H_2O}} + \sum_{i=1}^{n} \frac{m_{dp_i}}{k_{ads,dp_i}} \quad \text{(Ii)}$$

with
$m_{dpi}$ being the amount of a respective decomposition product $dp_1$, $dp_2$, ... $dp_n$ present in the insulation medium, with i being an index for the i-th decomposition product, and $k_{ads,dpi}$ being the adsorption capability of the adsorber towards the respective i-th decomposition product $dp_1$, $dp_2$, ... $dp_n$ at the predetermined temperature $T_0$ (or first predetermined temperature $T_1$ in embodiments mentioning first and second predetermined temperatures $T_1$, $T_2$ instead of $T_0$).

EXAMPLE

For a zeolite having an average pore size of about 5 Å, the optimum amount for its use in an electrical apparatus comprising passive components was determined as follows:

For determining the lower limit of the amount of zeolite, the amount of water in the insulation space compartment was calculated by multiplying the amount of polymeric material contained in the insulation space compartment with the amount of water contained in the polymeric material, adding 1 g of water per square meter directly exposed to the insulation medium and further adding 1 g of water relating to an empirical value for the diffusion of water through sealings over long term operation of the apparatus of up to 30 years. Since 10 kg of polymeric material containing 2 g of water per kg is contained in the insulation space compartment (approximately at the order of a cubic meter), the total amount of water to be adsorbed is 22 g.

For a $k_{ads,H2O}$ of the adsorber of about 0.147, the lower limit of the amount of adsorber defined by $$m_{ads} \geq \frac{m_{H_2O}}{k_{ads,H_2O}}$$

is thus 110 g.

The upper limit was determined according to the formula $$m_{ads} \leq 0.1 \frac{m_{CO_2}}{k_{ads,CO_2}}$$

Given an amount $m_{CO2}$ of $CO_2$ of about 8.8 kg (about 5 bar) and given a $k_{ads,CO2}$ of the zeolite of about 0.2, the upper limit of zeolite is 4.4 kg. The optimum amount of zeolite to be introduced in the insulation space compartment is thus between 110 g and 4.4 kg.

Throughout this application, terms like "preferable" "particular", "particularly preferred", etc. designate optional embodiments only.

The invention claimed is:

1. Electrical apparatus for the generation, transmission, distribution and/or usage of electrical energy, said electrical apparatus comprising
a housing enclosing an electrical apparatus interior space, at least a portion of the electrical apparatus interior space forming at least one insulation space, in which an electrical component is arranged and which contains an insulation medium surrounding the electrical component, the insulation medium comprising carbon dioxide,
the insulation space comprising at least one insulation space compartment, in which an adsorber for reducing or eliminating an amount of water and further contaminants from the insulation medium is arranged,
wherein an upper limit of an amount of the adsorber $m_{ads}$ complies with the following formula (II):

$$m_{ads} \leq 0.1 \frac{m_{CO_2}}{k_{ads,CO_2}} \quad \text{(II)}$$

with
$m_{CO2}$ being the amount of carbon dioxide present in the respective insulation space compartment at the time when placing the adsorber into the insulation space compartment; and
$k_{ads,CO2}$ being the adsorption capability of the adsorber towards carbon dioxide at the predetermined temperature $T_0$ at the time when placing the adsorber into the insulation space compartment, and
wherein the insulation medium additionally comprises an organofluorine compound, and a lower limit of the amount of adsorber $m_{ads}$ arranged in the at least one insulation space compartment, in particular in each insulation space compartment, complies with the following formula (Ii):

$$m_{ads} \geq \frac{m_{H_2O}}{k_{ads,H_2O}} + \sum_{i=1}^{n} \frac{m_{dp_i}}{k_{ads,dp_i}} \quad \text{(Ii)}$$

with
$m_{H2O}$ being the amount of water present in the respective insulation space compartment at the time when placing the adsorber into the insulation space compartment,
$k_{ads,H2O}$ being the adsorption capability of the adsorber towards water at a predetermined temperature $T_0$ at the time when placing the adsorber into the insulation space compartment, $m_{dpi}$ being the amount of a respective decomposition product $dp_1, dp_2, \ldots dp_n$ created in and/or released into the respective insulation space compartment between gas maintenance or gas replacement intervals, with i being an index for the i-th decomposition product, and $k_{ads,dpi}$ being the adsorption capability of the adsorber towards the respective i-th decomposition product $dp_1, dp_2, \ldots dp_n$ at the predetermined temperature $T_0$, and at least one decomposition product is a decomposition product of the organofluorine compound.

2. Electrical apparatus according to claim 1, wherein the adsorber is a molecular sieve.

3. Electrical apparatus according to claim 2, wherein the molecular sieve is a zeolite.

4. Electrical apparatus according to claim 2, wherein the molecular sieve has an average pore size from 2 Å to 13 Å.

5. Electrical apparatus according to claim 1, wherein the insulation space is formed by at least two insulation space compartments separated from each other.

6. Electrical apparatus according to claim 5, wherein the volume of the at least two compartments differ from each other by a factor of at least 1.5.

7. Electrical apparatus according to claim 1, further comprising a desiccant selected from the group consisting of: calcium, calcium sulphate, in particular drierite, calcium carbonate, calcium hydride, calcium chloride, potassium carbonate, potassium hydroxide, copper(II) sulphate, calcium oxide, magnesium, magnesium oxide, magnesium sulphate, magnesium perchlorate, sodium, sodium sulphate, aluminium, lithium aluminium hydride, aluminium oxide, activated alumina, montmorrilonite, phosphorpentoxide, silica gel, a cellulose filter, and mixtures thereof.

8. Electrical apparatus according to claim 1, wherein the insulation medium further comprises a background gas selected from the group consisting of: air, air component, oxygen ($O_2$), nitrogen ($N_2$), nitrogen oxide, and mixtures thereof.

9. Electrical apparatus according to claim 8, wherein the insulation medium comprises the background gas consisting of a mixture of carbon dioxide and oxygen.

10. Electrical apparatus according to claim 9, wherein the ratio of the amount of carbon dioxide to the amount of oxygen ranges from 50:50 to 100:1.

11. Electrical apparatus according to claim 1, wherein the organofluorine compound is selected from the group consisting of: fluoroethers, in particular hydrofluoromonoethers, fluoroketones, in particular perfluoroketones, fluoroolefins, in particular hydrofluoroolefins, fluoronitriles, in particular perfluoronitriles, and mixtures thereof.

12. Electrical apparatus according to claim 1, wherein the insulation medium comprises a hydrofluoromonoether containing at least three carbon atoms.

13. Electrical apparatus according to claim 1, wherein the insulation medium comprises a fluoroketone containing from four to twelve carbon atoms.

14. Electrical apparatus according to claim 1, wherein the insulation medium comprises a perfluoroalkylnitrile, in particular a component selected from the group consisting of: perfluoroacetonitrile, perfluoropropionitrile ($C_2F_5CN$), perfluorobutyronitrile ($C_3F_7CN$), perfluoroisobutyronitrile ($(CF_3)_2CFCN$), perfluoro-2-methoxypropanenitrile ($CF_3CF(OCF_3)CN$), and mixtures thereof.

15. Electrical apparatus according to claim 1, wherein the amount of adsorber $m_{ads}$ arranged in each insulation space compartment complies with the formula (Ii):

$$m_{ads} \geq \frac{m_{H_2O}}{k_{ads,H_2O}} + \sum_{i=1}^{n} \frac{m_{dp_i}}{k_{ads,dp_i}}. \tag{Ii}$$

16. Electrical apparatus according to claim 1, wherein the electrical apparatus is a high voltage apparatus or a medium voltage apparatus.

17. Electrical apparatus according to claim 1, wherein the electrical apparatus is a part of or is a: high voltage apparatus, medium voltage apparatus, low voltage apparatus, direct-current apparatus, switchgear, air-insulated switchgear, part or component of air-insulated switchgear, gas-insulated metal-encapsulated switchgear (GIS), part or component of gas-insulated metal-encapsulated switchgear, air-insulated transmission line, gas-insulated transmission line (GIL), bus bar, bushing, air-insulated insulator, gas-insulated metal-encapsulated insulator, cable, gas-insulated cable, cable joint, current transformer, voltage transformer, sensors, surge arrester, capacitor, inductance, resistor, current limiter, high voltage switch, earthing switch, disconnector, load-break switch, circuit breaker, gas circuit breaker, vacuum circuit breaker, generator circuit breaker, medium voltage switch, ring main unit, recloser, sectionalizer, low voltage switch, transformer, distribution transformer, power transformer, tap changer, transformer bushing, electrical rotating machine, generator, motor, drive, semiconducting device, power semiconductor device, power converter, computing machine; and components and/or combinations of such devices.

18. Electrical apparatus according to claim 1, wherein the at least one insulation space compartment comprises a volume-specific amount of less than 5 kg adsorber per cubic meter.

19. Electrical apparatus for the generation, transmission, distribution and/or usage of electrical energy, the electrical apparatus comprising:
a housing enclosing an electrical apparatus interior space, at least a portion of the electrical apparatus interior space forming at least one insulation space, in which an electrical component is arranged and which contains an insulation medium surrounding the electrical component, the insulation medium comprising carbon dioxide,
the insulation space comprising at least one insulation space compartment, in which an adsorber for reducing or eliminating an amount of water and an amount of further contaminants from the insulation medium is arranged,
wherein the at least one insulation space compartment comprises a volume-specific amount of less than 5 kg adsorber per cubic meter of the volume of the insulation space compartment,
wherein the insulation medium additionally comprises an organofluorine compound, and a lower limit of the amount of adsorber $m_{ads}$ arranged in the at least one insulation space compartment complies with the following formula (Ii):

$$m_{ads} \geq \frac{m_{H_2O}}{k_{ads,H_2O}} + \sum_{i=1}^{n} \frac{m_{dp_i}}{k_{ads,dp_i}} \tag{Ii}$$

with
- $m_{H2O}$ being the amount of water present in the respective insulation space compartment at the time when placing the adsorber into the insulation space compartment,
- $k_{ads,H2O}$ being the adsorption capability of the adsorber towards water at a predetermined temperature $T_0$ at the time when placing the adsorber into the insulation space compartment,
- $m_{dpi}$ being the amount of a respective decomposition product $dp_1, dp_2, \ldots dp_n$ created in and/or released into the respective insulation space compartment between gas maintenance or gas replacement intervals, with i being an index for the i-th decomposition product, and
- $k_{ads,dpi}$ being the adsorption capability of the adsorber towards the respective i-th decomposition product $dp_1$, $dp_2, \ldots dp_n$ at the predetermined temperature $T_0$, and
- at least one decomposition product is a decomposition product of the organofluorine compound.

20. Electric apparatus according to claim 19, wherein the at least one insulation space compartment comprises a volume-specific amount of less than 1.25 kg adsorber per cubic meter.

21. Electric apparatus according to claim 19, wherein the electrical component is a non-circuit-breaker component and the at least one insulation space compartment comprises a volume-specific amount of less than 2 kg adsorber per cubic meter.

22. Electrical apparatus according to claim 19, wherein the predetermined temperature is room temperature.

23. Electrical apparatus according to claim 1, wherein the amount of adsorber $m_{ads}$ is such that when introducing the adsorber into the insulation space compartment, the insulation medium undergoes a change in the partial pressure of $CO_2$ of less than 15%.

24. Electrical apparatus according to claim 1, wherein the amount of adsorber $m_{ads}$ is selected closer to the upper limit given by formula (II) than to the lower limit given by formula (Ii).

25. Electrical apparatus according to claim 1, wherein the amount of adsorber $m_{ads}$ is selected such that the lower limit given by formula (Ii) is determined at a first predetermined temperature $T_1$, the upper limit given by formula (II) is determined at a second predetermined temperature $T_2$, and the first predetermined temperature $T_1$ is chosen higher than the second predetermined temperature $T_2$.

26. Electrical apparatus according to claim 24, wherein the amount of adsorber $m_{ads}$ is selected such the first predetermined temperature $T_1$ is chosen equal to or higher than the predetermined temperature $T_0$ and in particular about room temperature, and the second predetermined temperature $T_2$ is chosen smaller than the predetermined temperature $T_0$ and in particular lower than room temperature or equal to the minimal operating temperature of the electrical apparatus.

27. Method for determining an optimum amount of an adsorber for the adsorption of water and further contaminants in an electrical apparatus for the generation, transmission, distribution and/or usage of electrical energy, the electrical apparatus comprising a housing enclosing an electrical apparatus interior space, at least a portion of the electrical apparatus interior space forming at least one insulation space, in which an electrical component is arranged and which contains an insulation medium surrounding the electrical component, the insulation medium comprising carbon dioxide, the insulation space comprising at least one insulation space compartment, the method comprising:

a) determining for the at least one insulation space compartment the amount of water $m_{H2O}$ present in the insulation space compartment at the time when placing the adsorber into the insulation space compartment;
b) determining for the at least one insulation space compartment the amount of carbon dioxide $m_{CO2}$ present in the insulation space compartment at the time when placing the adsorber into the insulation space compartment;
wherein the insulation medium additionally comprises an organofluorine compound,
c) determining for the at least one insulation space compartment the lower limit of the amount of adsorber $m_{ads}$ by formula (Ii):

$$m_{ads} \geq \frac{m_{H_2O}}{k_{ads,H_2O}} + \sum_{i=1}^{n} \frac{m_{dp_i}}{k_{ads,dp_i}} \qquad (Ii)$$

with
- $k_{ads,H2O}$ being the adsorption capability of the adsorber towards water at a predetermined temperature $T_0$ or at a first predetermined temperature $T_1$ at the time when placing the adsorber into the insulation space compartment,
- $m_{dpi}$ being the amount of a respective decomposition product $dp_1, dp_2, \ldots dp_n$ created in and/or released into the respective insulation space compartment between gas maintenance or gas replacement intervals, with i being an index for the i-th decomposition product, and
- $k_{ads,dpi}$ being the adsorption capability of the adsorber towards the respective i-th decomposition product $dp_1$, $dp_2, \ldots dp_n$ at the predetermined temperature $T_0$ or at the first predetermined temperature $T_1$, with
at least one decomposition product being a decomposition product of the organofluorine compound, and
d) determining for the at least one insulation space compartment the upper limit of the amount of adsorber $m_{ads}$ by formula (II)

$$m_{ads} \leq 0.1 \frac{m_{CO_2}}{k_{ads,CO_2}} \qquad (II)$$

with
- $k_{ads,CO2}$ being the adsorption capability of the adsorber towards carbon dioxide at the predetermined temperature $T_0$ or at a second predetermined temperature $T_2$ at the time when placing the adsorber into the insulation space compartment.

28. Method according to claim 27, including the method element of selecting the amount of adsorber $m_{ads}$ closer to the upper limit given by formula (II) than to the lower limit given by formula (II).

29. Method according to claim 27, including the method element of selecting the amount of adsorber $m_{ads}$ such that the lower limit given by formula (Ii) is determined at the first predetermined temperature $T_1$, the upper limit given by formula (II) is determined at the second predetermined temperature $T_2$, and the first predetermined temperature $T_1$ is chosen higher than the second predetermined temperature $T_2$.

30. Method according to claim 29, wherein the amount of adsorber $m_{ads}$ is selected such the first predetermined temperature $T_1$ is chosen equal to about room temperature, and the second predetermined temperature $T_2$ is chosen lower than room temperature or equal to the minimal operating temperature of the electrical apparatus.

31. Method according to claim 27, wherein the amount of adsorber is such that when introducing the adsorber into the insulation space compartment, the insulation medium undergoes a change in the partial pressure of $CO_2$ of less than 15%.

32. Method according to claim 27, wherein the predetermined temperature is selected equal to room temperature.

* * * * *